Sept. 23, 1952 B. E. DENTON 2,611,821
COMPENSATED AMPLITUDE DISCRIMINATORY CIRCUITS
Filed Feb. 26, 1949
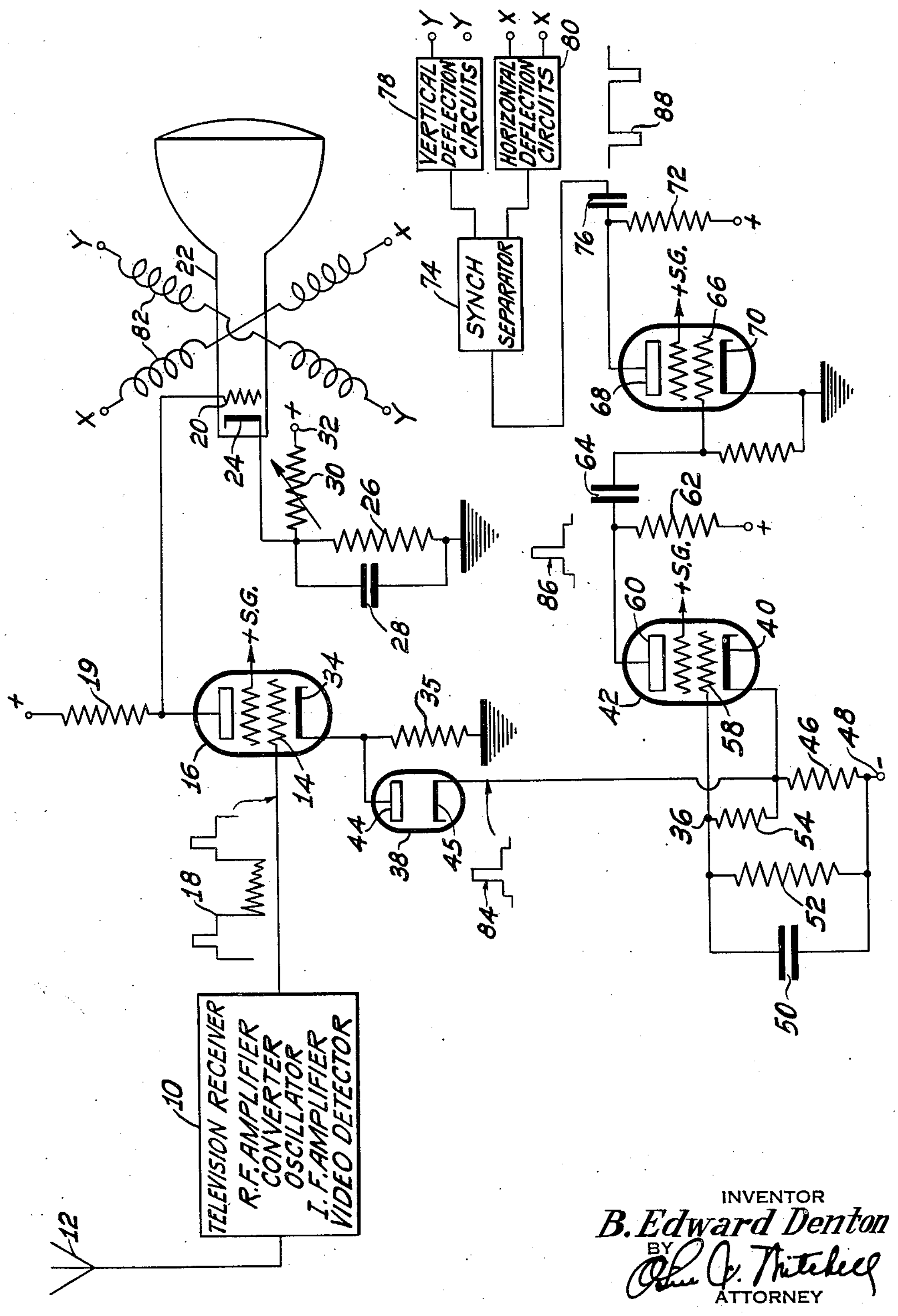
INVENTOR
B. Edward Denton
BY
ATTORNEY Patented Sept. 23, 1952

2,611,821

UNITED STATES PATENT OFFICE 2,611,821

COMPENSATED AMPLITUDE DISCRIMINATORY CIRCUITS

Bethel Edward Denton, Merchantsville, N. J., assignor to Radio Corporation of America, a corporation of Delaware Application February 26, 1949, Serial No. 78,512

1 Claim. (Cl. 178—7.3)

The present invention relates to threshold or gate circuits and more particularly to those circuits known as clipping circuits wherein a fixed percentage of an applied input wave is to be translated by the threshold circuit.

In one of its more specific forms, the present invention concerns itself with an improved synchronizing signal separator for use with television receiving circuits adapted to handle standard types television signals, the invention providing substantially "constant percentage" clipping action regardless of variations of applied input signals.

In the electrical art especially that phase dealing with communication equipment, it is often desirable to provide a threshold or gate circuit which will pass a constant percentage of applied input signals. Particularly do such circuits find extended use in the field of television wherein the composite television signal is often broken down into its video signal component and its synchronizing component. As is well known to those skilled in the art, in the composite video signal, the synchronizing component amplitude extends substantially beyond the most remote excursions of the video signal. According to common television radio transmission standards, the peaks of synchronizing signals represent substantially 100% of the transmitter amplitude modulation whereas the highest amplitude excursions of the video signals (and blanking) are limited to approximately 75% of transmitter amplitude modulation. In order to properly reproduce the television image at a receiving location, it is necessary to separate the synchronizing component from the video signal component.

It therefore can be seen that a circuit for properly separating the synchronizing components from the composite signal must be responsive to pass not much more than 25% of the demodulated video signal. In order to satisfactorily accomplish this fixed percentage synchronizing signal separation under conditions where the received signal varies considerably in amplitude, it is necessary during circuit operation to alter the threshold on the clipping circuit so as to compensate for the changes in signal amplitude.

It is further common practice in television receivers to limit received signal amplitudes in order to minimize the effects of spurious noise on the receiver deflection circuit synchronization. This limiting action may be accomplished by circuits taking many well known forms, some of which may be somewhat complicated and costly in manufacture.

It is therefore a purpose of the present invention to provide an amplitude discriminatory gate circuit which operates to communicate only a fixed percentage of applied signal.

It is another purpose of the present invention to provide a simple and novel clipper circuit for removing a substantially fixed percentage of the higher excursion of an applied signal over a very wide range of signal outer amplitude levels.

It is further a purpose of the present invention to provide a simple and economical synchronizing signal clipping circuit for use in television receiving systems wherein the synchronizing information clipped by the circuit remains representative of a fixed percentage of composite video signal regardless of amplitude variations in the applied composite signal.

It is still further a purpose of the present invention to provide a novel synchronizing signal clipping circuit for television receiving circuits which utilizes a minimum of circuit parameters and yet provides the function of fixed percentage clipping action, amplification of the clipped signal and limiting of the amplified version of the clipped signal.

The novel features which are believed to be characteristic of the present invention are set forth in the appended claim. The invention itself, however, both to its organization and method of operation, as well as other objects and advantages, will be clearly understood from the teachings of the following description, especially when taken in consideration with the accompanying drawing which shows the application of the present invention to a typical television receiving circuit.

Referring now to the drawing, there is shown in block form at 10 the conventional components of a television receiver including an R. F. amplifier, a converter, an oscillator, an I. F. amplifier, and a video detector. Incoming signals intercepted by the antenna 12 are demodulated by the video detector and applied to the control grid 14 of a video amplifier stage, such as 16. The demodulated video signals 18 are applied to the control grid 14 in a sync positive direction so that the output signal of the video amplifier, appearing across the load resistance 19, will be of proper polarity for modulation of the control grid 20 of the cathode ray image reproducing tube 22. The cathode 24 of the cathode ray tube 22 is connected with ground through a cathode resistor 26 which is properly by-passed by capacitor 28. A variable bleeder resistor 30 is then connected from a source of positive potential 32 to the upper terminals of the cathode resistor 26 to provide a conventional form of brightness control for the reproduced image. The video amplifier 16 has its cathode 34 connected with ground through a cathode resistance 35 across which will, of course, appear a sync positive version of the demodulated video signal 18.

According to the form of the present invention shown in the drawing, a diode 38 is connected from the cathode 34 of the video amplifier 16 to the cathode 40 of a second electron discharge tube 42, the anode 44 of the diode 38 being connected with the cathode of the video amplifier. The cathode 40 of discharge tube 42 is then connected through a control resistor 46 to a source of negative potential 48. An integrating circuit, such as shown by capacitor 50 and resistor 52, is connected in shunt with the control resistor 46 through series resistor 54. The integrating circuit side 36 of the series resistor 54 is shown as being connected with the control electrode 58 of the discharge tube 42. In a conventional manner, the anode 60 of the discharge tube 42 is supplied with a positive potential through an output load impedance 62. The separated synchronizing pulses are then coupled with capacitor 64 to the control grid 66 of a sync limiter 68. The input resistance of the sync limiter 68 is connected from the control electrode 66 to the cathode 70. The limited sync appearing across the output resistance 72 of the limiter 68 is applied to some conventional sync separator circuit, such as shown at 74 through coupling capacitor 76. In the sync separator circuit 74, the vertical synchronizing signals are separated from the horizontal synchronizing signals and respectively applied to the vertical and horizontal deflection circuits 78 and 80 with respective output terminals Y—Y and X—X provided for connection to the appropriate beam deflection coils 82.

Detailed operation of the above circuit in accordance with the present invention is substantially as follows: The sync positive signals developed across the cathode resistor 35 of the video amplifier 16 are applied to the anode 44 of the diode 38. Due to screen and anode current of the discharge tube 42 through the control resistor 46, the potential applied to the cathode 45 of the diode is adjusted to be substantially more positive than the potential statically appearing at the diode anode 44.

Thus, only the more positive excursions of the composite video signal, which may correspond to its synchronizing component and a portion of the blanking pedestal, will cause the diode 38 to conduct. Consequently, the waveform passed by the diode 38 will be substantially that shown at 84 which in turn is applied to the cathode 40 of the discharge tube 42. The discharge tube 42 is thus operated as a cathode driven amplifier and an amplified version 86 of the same positive sync polarity will appear across the load resistor 62 in its output circuit.

The signal 86 is then capacitively coupled to the grid 66 of the limiter stage 68. Inasmuch as there is no control grid bias on the vacuum tube 68, the positive peaks of the amplified separated sync 86 will then cause grid current conduction by the control grid 66 which will tend to limit any spurious noise which might extend beyond the positive extent of the applied clipped sync.

Furthermore, since the grid current will tend to charge the capacitor 64 such as to develop a variable negative bias on the control grid 66, a second well known clipping action may be obtained to provide across the output resistor 72 a negative sync signal 88 more completely free of blanking pedestal or lower amplitude composite signal component.

If the received signal intensity drops to produce a decrease in the amplitude of the demodulated signal 18, the novel arrangement of the applicant's invention will act to maintain the clipped signal 84 at a substantially constant percentage of the overall composite signal 18. This action can be understood since a portion of the clipped signal 84 has been applied to the integrating circuit comprising condenser 50 and resistor 52, so that voltage thereacross will vary in accordance with the amplitude of the clipped signal 84. Under static conditions, the grid 58 of the vacuum tube 42 is maintained at a negative potential with respect to the cathode 40 by an amount equal to the D. C. voltage appearing at the junction 36 of resistor 52 and 54 which effectively divides the voltage appearing across the control resistor 46. Under normal reception, the voltage at the grid 58 becomes slightly more positive because of the integration of the clipped signal 84 across the integrating circuit 50 and 52. Should then the signal 18 decrease, the energy represented by the clipped signal 84 will be reduced and the voltage on the grid 58 of the vacuum tube 42 will become more negative. This will decrease the current through the control resistor 46 which is connected in series with the diode 38 thereby making the diode-cathode 45 more negative. Consequently, the diode 38 will clip more deeply into the composite signal developed across the resistor 35 and tend to maintain the percentage of clipping constant.

From the foregoing it can be seen in the above arrangement that the applicant has provided a simple, novel and effective combination circuit for providing approximately constant percentage sync clipping of television signals, amplification of the clipped signals as well as a second limiting and clipping function to provide a separated synchronizing signal virtually free from signal fading affects and noise of greater amplitude than the clipped signal.

What is claimed is:

An amplitude discriminatory circuit for communicating a substantially fixed percentage of the more positive extent of an applied signal and comprising: an input terminal for the applied signal; a resistance connected from said terminal to a first point of fixed potential; an electron discharge tube having at least an anode, a cathode, and an input electrode; an impedance in the anode-cathode circuit of said discharge tube, said impedance being also connected with a second point of fixed potential, a unilateral conduction device having an anode and a cathode, a connection from said unilateral conduction device anode to said input terminal; a connection from said unilateral conduction device cathode to a point on said discharge tube anode-cathode circuit impedance, said connection being such to include a portion of said anode-cathode impedance as a portion of a load circuit for said unilateral conduction device; an integrating circuit having one terminal thereof connected to said second point of fixed potential, an impedance connected from another terminal of said integrating network to said conduction device cathode, means including a connection from said discharge device input electrode to said last named impedance for controlling the average current through said electron discharge tube in accordance with the value of the integrated voltages across said integrating circuit thereby to alter the current through said discharge tube anode-cathode impedance in accordance with the value of developed integrating circuit voltage such to maintain the amplitude of the signal appearing at said unilateral conduction device cathode at a substantially fixed percentage of the signal applied to said input terminal regardless of amplitude variations therein.

B. EDWARD DENTON.

REFERENCES CITED

The following references are of record in the file of this patent:

UNITED STATES PATENTS

| Number | Name | Date |
|---|---|---|
| 2,181,572 | Bowman-Manifold et al. | Nov. 28, 1939 |
| 2,279,007 | Mortley | Apr. 7, 1942 |
| 2,298,084 | Fyler | Oct. 6, 1942 |

FOREIGN PATENTS

| Number | Country | Date |
|---|---|---|
| 115,307 | Australia | June 25, 1942 |

OTHER REFERENCES

Wireless World, Feb. 23, 1939, pages 174–177.